United States Patent
Nobukiyo

(10) Patent No.: US 9,578,607 B2
(45) Date of Patent: Feb. 21, 2017

(54) RADIO COMMUNICATION SYSTEM, RADIO STATION, AND METHOD FOR CONTROLLING TRANSMISSION POWER

(71) Applicant: NEC Corporation, Minato-ku, Tokyo (JP)

(72) Inventor: Takahiro Nobukiyo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/764,415

(22) PCT Filed: Jan. 24, 2014

(86) PCT No.: PCT/JP2014/000348
§ 371 (c)(1),
(2) Date: Jul. 29, 2015

(87) PCT Pub. No.: WO2014/119264
PCT Pub. Date: Aug. 7, 2014

(65) Prior Publication Data
US 2015/0358925 A1 Dec. 10, 2015

(30) Foreign Application Priority Data
Jan. 30, 2013 (JP) .................................. 2013-015167

(51) Int. Cl.
| | | |
|---|---|---|
| *H04W 52/34* | (2009.01) | |
| *H04W 52/36* | (2009.01) | |
| *H04W 52/26* | (2009.01) | |
| *H04W 16/32* | (2009.01) | |
| *H04W 52/18* | (2009.01) | |

(52) U.S. Cl.
CPC ........... *H04W 52/343* (2013.01); *H04W 16/32* (2013.01); *H04W 52/18* (2013.01); *H04W 52/267* (2013.01); *H04W 52/362* (2013.01)

(58) Field of Classification Search
CPC ............................. H04W 16/32; H04W 52/343
USPC ....... 455/67.11, 522, 69, 443, 449, 446, 453
See application file for complete search history.

(56) References Cited

U.S. PATENT DOCUMENTS

| 2007/0202891 A1* | 8/2007 | Diachina ............... H04W 68/00 455/458 |
| 2010/0131213 A1* | 5/2010 | Bleys .................... G01L 19/086 702/50 |
| 2010/0144365 A1* | 6/2010 | Pan ................... H04W 72/0486 455/453 |

FOREIGN PATENT DOCUMENTS

| JP | 2010-062951 A | 3/2010 |
| JP | 2012-249106 A | 12/2012 |
| WO | 2011/055842 A1 | 5/2011 |

OTHER PUBLICATIONS

International Search Report for PCT Application No. PCT/JP2014/000348, mailed on Apr. 1, 2014.

(Continued)

*Primary Examiner* — John J Lee

(57) ABSTRACT

User throughput fairness between a small cell and a macrocell is improved without affecting load balancing with another small cell. A radio station (100) having a radio area (100a) thereof, at least a part of which is adjacent to a radio area (300a) which is larger than the radio area (100a) of the radio station (100) and is managed by another radio station (300), acquires a load on the own station and a load on the another radio station and controls the transmission power of a radio terminal (200) connected to the radio area of the own cell, based on the relative magnitude of the load on the own cell to the load on the another radio station.

20 Claims, 5 Drawing Sheets

(56) References Cited

OTHER PUBLICATIONS

3rd Generation Partnership Project, 3GPP TSG RAN E-UTRA Physical layer procedures, 3GPP TS 36.213 V10.7.0 (Sep. 2012), pp. 9-10.
3rd Generation Partnership Project, 3GPP TSG RAN E-UTRA X2AP, 3GPP TS 36.213 V10.2.0 (Jun. 2011), pp. 59.

* cited by examiner

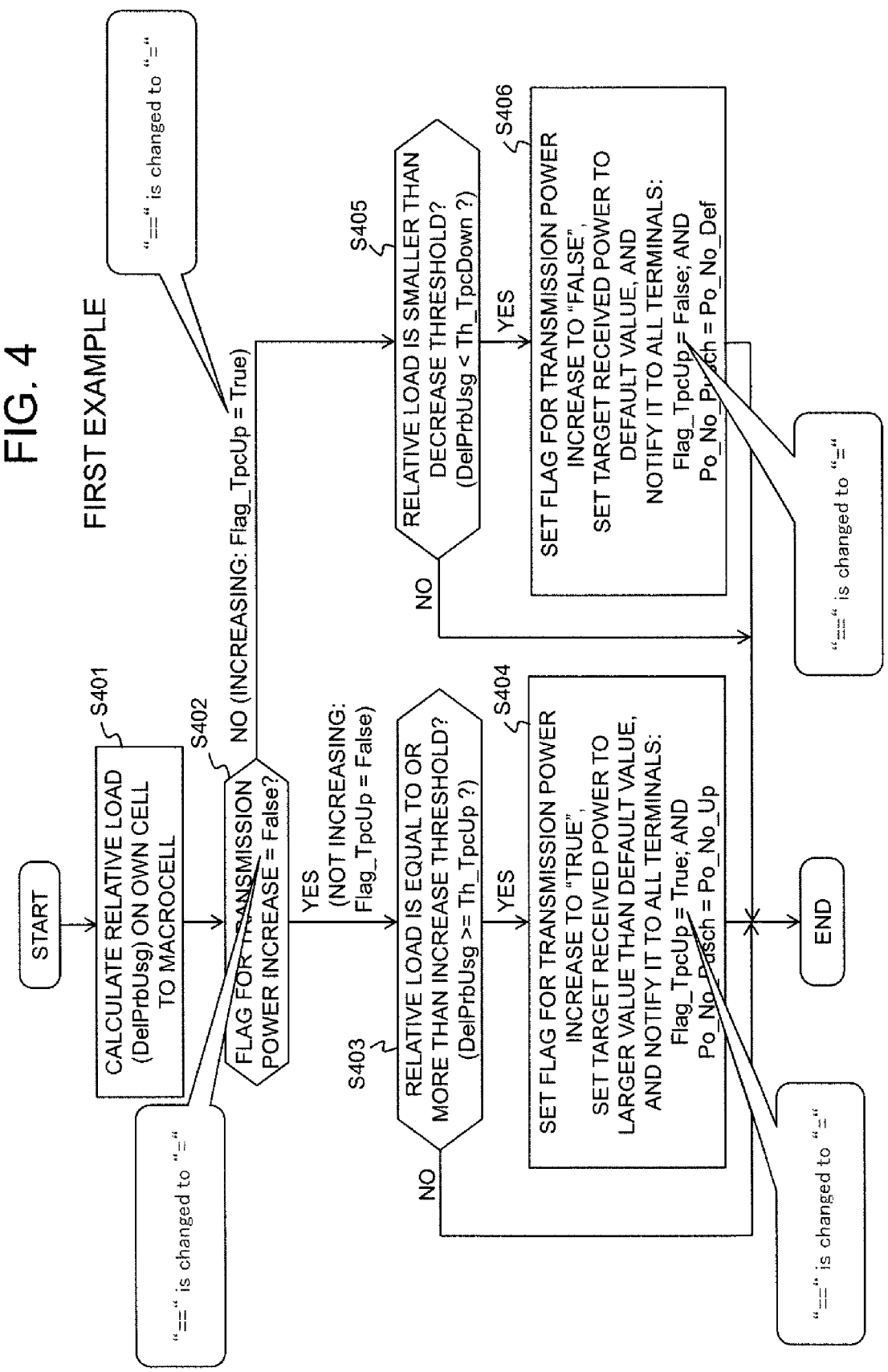

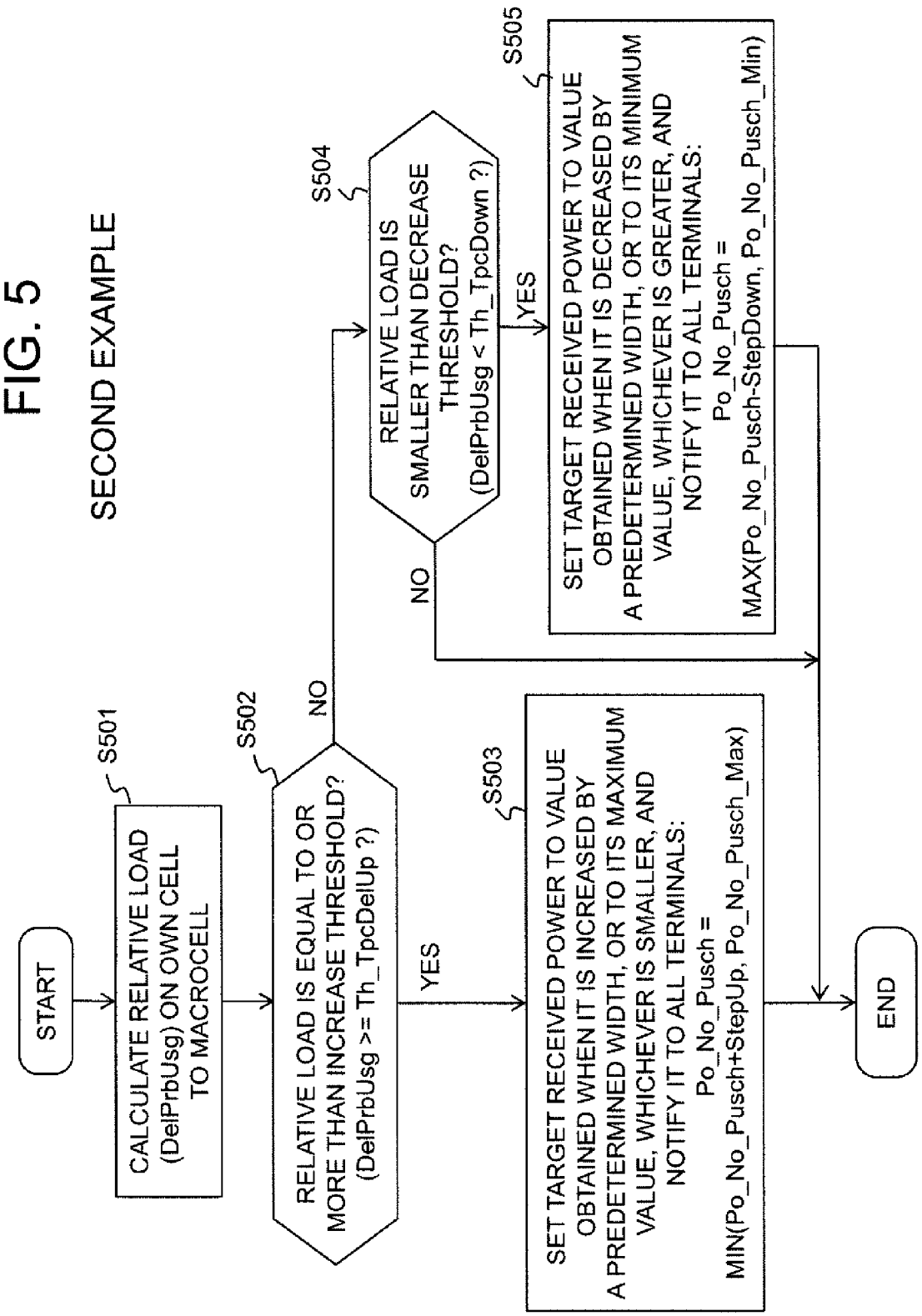

RADIO COMMUNICATION SYSTEM, RADIO STATION, AND METHOD FOR CONTROLLING TRANSMISSION POWER

This application is a National Stage Entry of PCT/JP2014/000348 filed on Jan. 24, 2014, which claims priority from Japanese Patent Application 2013-015167 filed on Jan. 30, 2013, the contents of all of which are incorporated herein by reference, in their entirety.

TECHNICAL FIELD

The present invention relates to a radio communication system in which cells of different sizes coexist and, more particularly, to a radio station that controls uplink transmission power from a radio terminal and a method for controlling uplink transmission power.

BACKGROUND ART

Radio communication systems such as LTE (Long Term Evolution) and LTE-A (LTE-Advanced) standardized in 3GPP (3rd Generation Partnership Project) are based on the premise that a plurality of radio base stations (hereinafter, referred to as base stations) are deployed, and each base station performs communication with radio terminals (hereinafter, referred to as terminals) in the communication area of the own station. This communication area is referred to as a cell, and a cell can also be divided into a plurality of areas by allowing antennas to have directivity. These divided areas are referred to as sector cells, and it is assumed hereinafter that simply stating "cell" refers to "sector cell".

In recent years, with the proliferation of smartphones and the like, the traffic volume of data communication is increasing acceleratedly. To cope with such a situation, it is essential not only to introduce radio communication systems of high spectral efficiency such as LTE, but also to introduce a large number of small cell base stations of low transmission power in addition to macrocell base stations covering wider areas. A network in which cells of such various sizes coexist is referred to as a heterogeneous network and attracts more and more attentions recently.

In LTE, generally, the same radio frequency band (hereinafter, referred to as "radio band") is used among neighbor cells. Accordingly, inter-cell interference may occur when neighbor cells use the same frequency band for transmission, regardless of uplink transmission or downlink transmission. In a heterogeneous network in particular, the problem of load balancing is also among concerns, in addition to the problem of interference caused along with the increasing number of cells. The problem of load balancing is that in a heterogeneous network, since cells of various sizes coexist and terminals distribute and congest in various ways, loads among cells become uneven, and so loads concentrate on a specific cell, resulting in the decreased communication rates of terminals in that cell.

In LTE, control of the uplink transmission power of a terminal is considered to be one of effective solutions to the above-described problems of interference and load balancing. Specifically, transmission power can be greatly adjusted for each terminal by controlling parameters related to target received power and propagation loss between a terminal and a base station (hereinafter, referred to as path loss), whereby avoidance of interference and improvement in channel quality can be achieved. Hereinafter, uplink transmission power control in LTE will be described briefly.

The transmission power $P_{PUSCH}$ of a PUSCH (Physical Uplink Shared CHannel), which is a channel for transmitting data of a terminal i, is defined as the following equation (1) (NPL 1):

$$P_{PUSCH} = \min[P_{CMAX}(i), 10 \log_{10}(M_{PUSCH} N) + P_{O\_PUSCH} + \alpha \cdot PL + \Delta_{TF}(i) + f(i)] \quad (1)$$

where $P_{CMAX}(i)$ [dBm] is the maximum transmission power of the terminal i, $M_{PUSCH}(i)$ is the number of resource blocks (RB) allocated to the PUSCH, $P_{O\_PUSCH}$ [dBm] is target received power, PL [dB] is a path loss between the terminal and base station estimated from a downlink, α is a path loss correction coefficient, $\Delta_{TF}(i)$ [dB] is a MCS (Modulation and Coding Schemes)-related parameter depending on deltaMCS-Enabled, which is notified from an upper layer, and f(i) [dBm] is a cumulative value of Closed Loop TPC (Transmission Power Control) correction coefficient $\delta_{PUSCH}$. A resource block RB is a unit of radio band assignment and is also referred to as a physical resource block (PRB).

Further, the above-mentioned target received power $P_{O\_PUSCH}$ is composed of two terms, as represented by the following equation (2):

$$P_{O\_PUSCH} = P_{O\_NOMINAL\_PUSCH} + P_{O\_UE\_PUSCH}(i) \quad (2)$$

where $P_{O\_NOMINAL\_PUSCH}$ [dBm] is target received power that is common among terminals connected to the same cell, and $P_{O\_UE\_PUSCH}(i)$ [dB] is a received power offset for each individual terminal. It is known that in the above equations (1) and (2), those greatly affecting an increase or a decrease in transmission power per resource block RB are a term related to the target received power ($P_{O\_PUSCH}$) and a term related to the path loss (α·PL).

PTL 1 proposes a solution to the above-described problems of interference and load balancing. According to PTL 1, when interference information OI (Over Load Indicator) and load information indicating a traffic rate are received from an adjacent cell, a base station adjusts the interference information by using the received load information and controls the uplink transmission power of a terminal in its own cell based on the adjusted interference information. For example, when the load on an adjacent cell is small, the received interference information is adjusted as if interference power is small, whereby it is possible to prevent a more decrease than necessary in transmission power. Note that the interference information OI is indication information that notifies alarm to an adjacent cell in PRB units when interference is measured (see NPL 2).

CITATION LIST

Patent Literature

[PTL 1]
International Publication No. WO2011/055842 pamphlet (paragraphs 0006-0010)

Non-Patent Literature

[NPL 1]
3GPP TS 36.213 V10.7.0 (2012-09), 3GPP TSG RAN E-UTRA Physical layer procedures, pp. 9-10
[NPL 2]
3GPP TS 36.213 V10.2.0 (2012-06), 3GPP TSG RAN E-UTRA X2AP, pp. 59

SUMMARY OF INVENTION

Technical Problem

However, the communication control method as in PTL 1 cannot solve the problems of load balancing among cells and throughput (users' perceived performance) fairness among users in some cases. Hereinafter, this will be described with reference to a heterogeneous network shown as an example in FIG. 1.

Referring to FIG. 1, when interference and load information ILm is received from a macrocell base station 20, a small cell base station 10 causes uplink transmission power to decrease in its own cell through the above-described control if the load on a macrocell is larger than a predetermined value. Since this control for decreasing uplink transmission power is performed even when the load on a small cell 10a is heavier than that on the macrocell 20a, there is a possibility that the user throughputs of terminals in the small cell 10a decrease significantly compared to the macrocell.

Moreover, according to the communication control method as in PTL 1, there is no guarantee that load balancing between the small cell 10a and macrocell 20a can be improved. Although it can be expected that the uplink transmission power of terminals in the macrocell 20a is made to decrease by notifying interference and load information ILs from the small cell 10a to the macrocell 20a, any loads heavier than a certain threshold are all uniformly determined to be heavy loads. Accordingly, if transmission power in the small cell 10a is also made to decrease as described above, the problem of load balancing is not solved.

Further, if the uplink transmission power of terminals in the macrocell 20a is made to decrease due to relationship with the small cell 10a, the load balance between the macrocell 20a and another small cell 11a is lost, and as a result, user throughput fairness in the entire area is lost (a 5-percent value of user throughput or the like decreases). The reason is that the transmission power of terminals in the macrocell is made to decrease at notice of a load from the small cell 10a to the macrocell 20a, regardless of load balancing between the macrocell 20a and small cell 11a.

Accordingly, an object of the present invention is to solve the above-described problems and to provide a radio communication system in which user throughput fairness between a small cell and a macrocell is improved without affecting load balancing with another small cell, as well as a radio station and a method for controlling uplink transmission power for the same.

Solution to Problem

A radio station according to the present invention is a radio station having a radio area thereof, at least a part of which is adjacent to a radio area which is larger than the radio area of the radio station and is managed by another radio station, characterized by comprising: load acquisition means that acquires a load on the own station and a load on the another radio station; and transmission power control means that controls transmission power of a radio terminal connected to the radio area of the own station, based on a relative magnitude of the load on the own station to the load on the another radio station.

A method for controlling an uplink transmission power of a radio terminal located in a radio area of a radio station, wherein at least a part of the radio area of the own station is adjacent to a radio area which is larger than the radio area of the own station and is managed by another radio station, characterized by comprising: acquiring a load on the own station and a load on the another radio station; and controlling transmission power of the radio terminal based on a relative magnitude of the load on the own station to the load on the another radio station.

A radio communication system according to the present invention is a radio communication system including a first radio station managing a first radio area and a second radio station managing a second radio area that is adjacent to at least part of the first radio area and is larger than the first radio area, characterized in that the first radio station uses first load information on the own station and second load information acquired from the second radio station to calculate a relative magnitude of the first load information to the second load information and, based on this relative magnitude, controls transmission power of a radio terminal connected to the radio area of the first radio station.

Advantageous Effects of Invention

According to the present invention, the transmission power of a radio terminal connected to the radio area of an own station is controlled based on the relative magnitude of a load on the own station to a load on another radio station, whereby it is possible to improve user throughput fairness between an own cell and a macrocell, without affecting load balancing between the macrocell and another small cell.

BRIEF DESCRIPTION OF DRAWINGS

FIG. 4 is a flowchart showing uplink transmission power control operations according to a first example.

FIG. 5 is a flowchart showing uplink transmission power control operations according to a second example.

DESCRIPTION OF EMBODIMENTS

According to an exemplary embodiment of the present invention, which will be described next, a small cell controls the uplink transmission power of a terminal in the own cell depending on the relative magnitude of a load on the own cell to a load notified from a macrocell, whereby user throughput fairness between the own cell and the macrocell can be improved without affecting load balancing between the macrocell and another small cell. Hereinafter, an exemplary embodiment and examples of the present invention will be described in detail with reference to drawings.

1. Exemplary Embodiment

Figure 1:
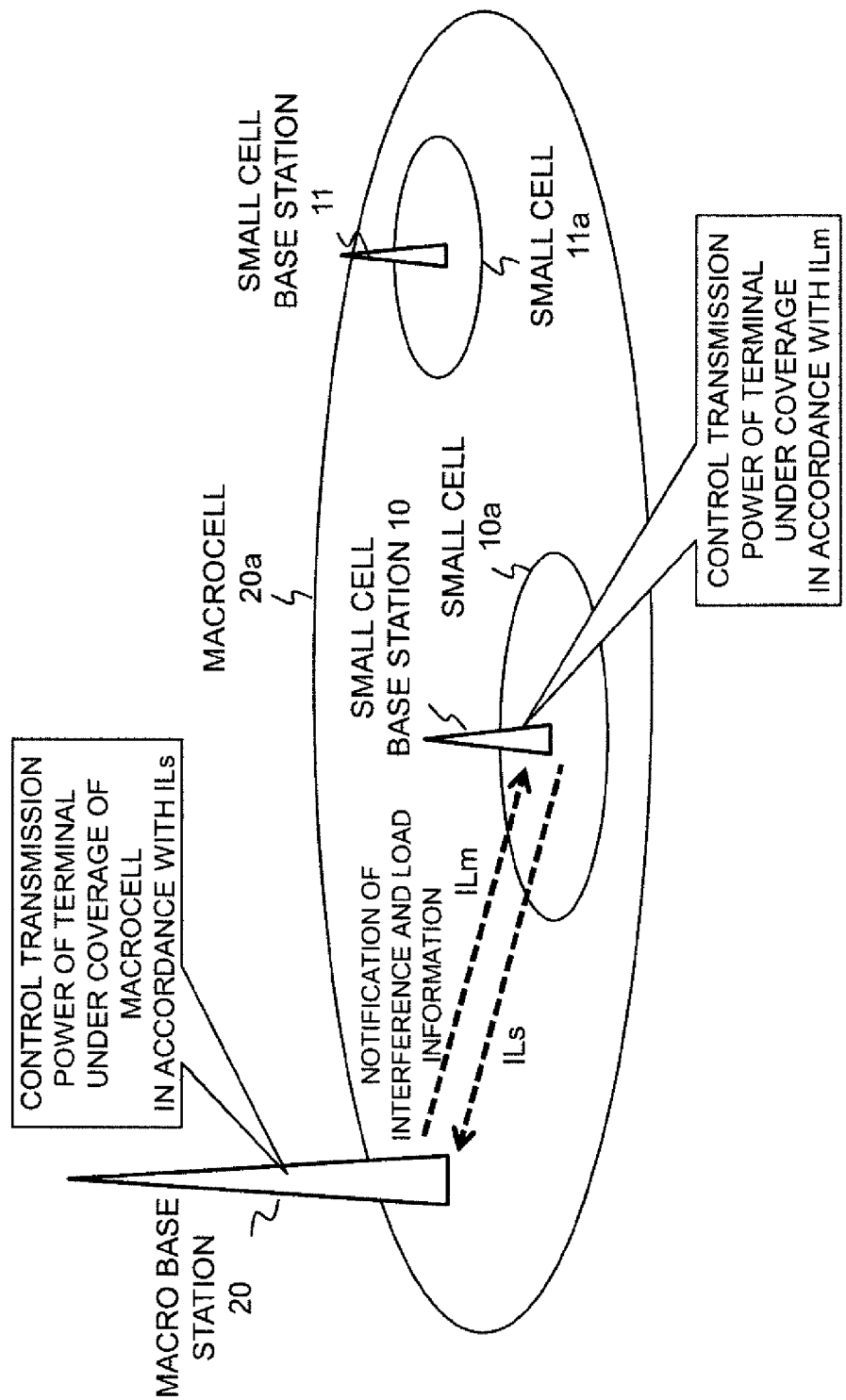
FIG. 1 is a diagram of a network architecture for describing problems with background arts.
Figure 2:
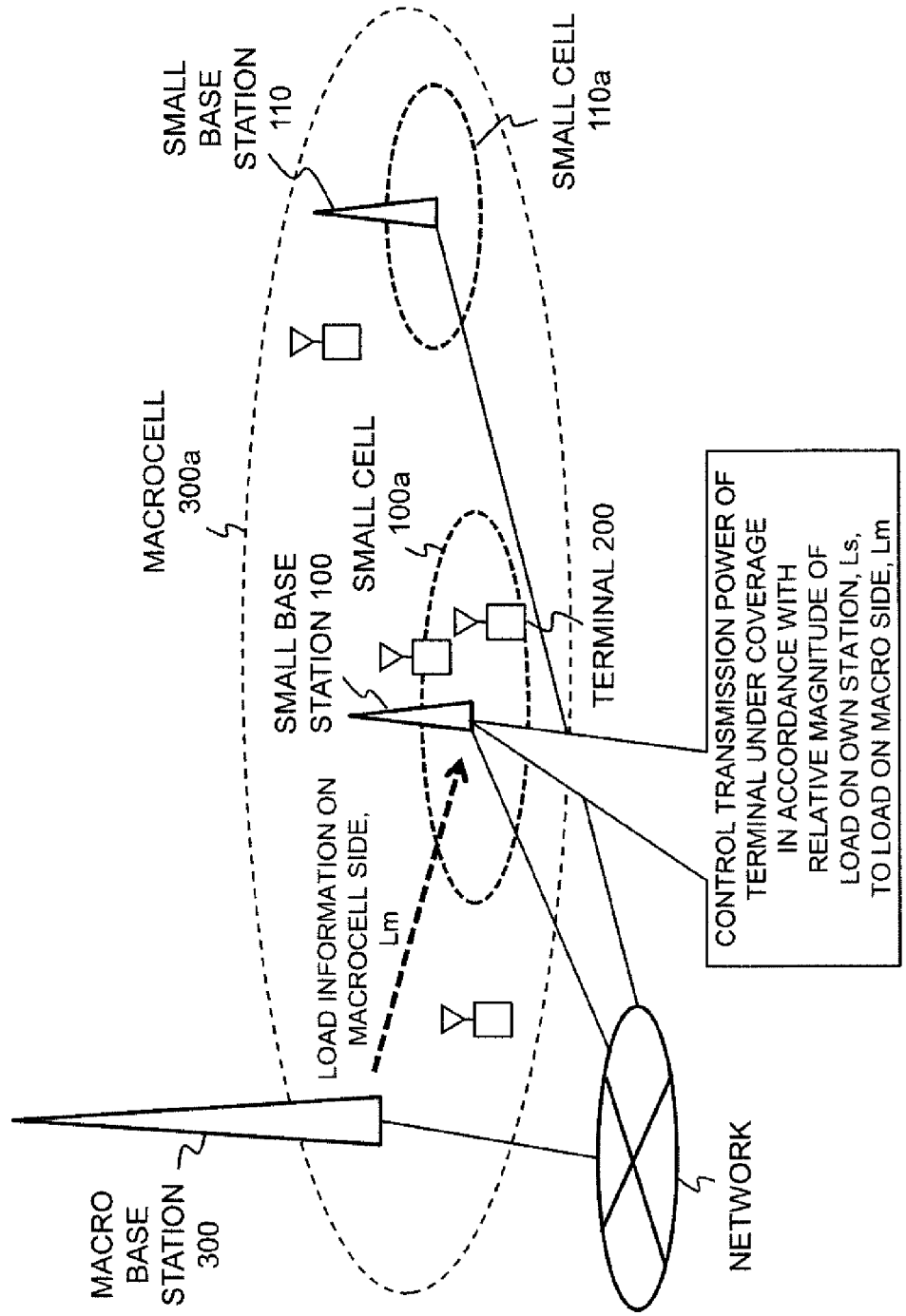
FIG. 2 is a diagram of a network architecture for describing uplink transmission power control in a radio communication system according to an exemplary embodiment of the present invention.

Referring to FIG. 2, a radio communication system according to an exemplary embodiment of the present invention is assumed to include: a small base station 100 which is a radio station managing a small cell 100a; a small base station 110 which is a radio station managing a small cell 110a; and a macro base station 300 which is a radio station managing a macrocell 300a, which are connected to and can communicate with each other through a network. Although the small cell 100a is surrounded by the macrocell 300a in the present exemplary embodiment, this is not a limitation, but it is sufficient that the small cell 100a is adjacent to the macrocell 300a. The small base station 100 calculates the relative magnitude of a load Ls on the own station to a load Lm on the macrocell, which is notified from the macro base station 300, and uses this relative load to control the uplink transmission power of a terminal 200 in the own cell 100a. Specifically, the small base station 100 adjusts an uplink transmission power parameter for the terminal 200.

The small base station 100 controls the uplink transmission power of the terminal 200 in the own cell, whereby user throughput fairness between the own cell 100a and the macrocell 300 can be improved without affecting load balancing between the macrocell 300 and the other small cell 110a, considering load balancing between the small cell and the macrocell, by controlling the transmission power of the terminal on the small cell side, which has a smaller path loss. In this manner, average user throughput in the entire network is improved.

2. System Architecture

Hereinafter, a system architecture according to the present exemplary embodiment will be described in more detail with reference to FIG. 3, assuming that the small cell 100a is a picocell and the small base station 100 is a pico base station.

Figure 3:
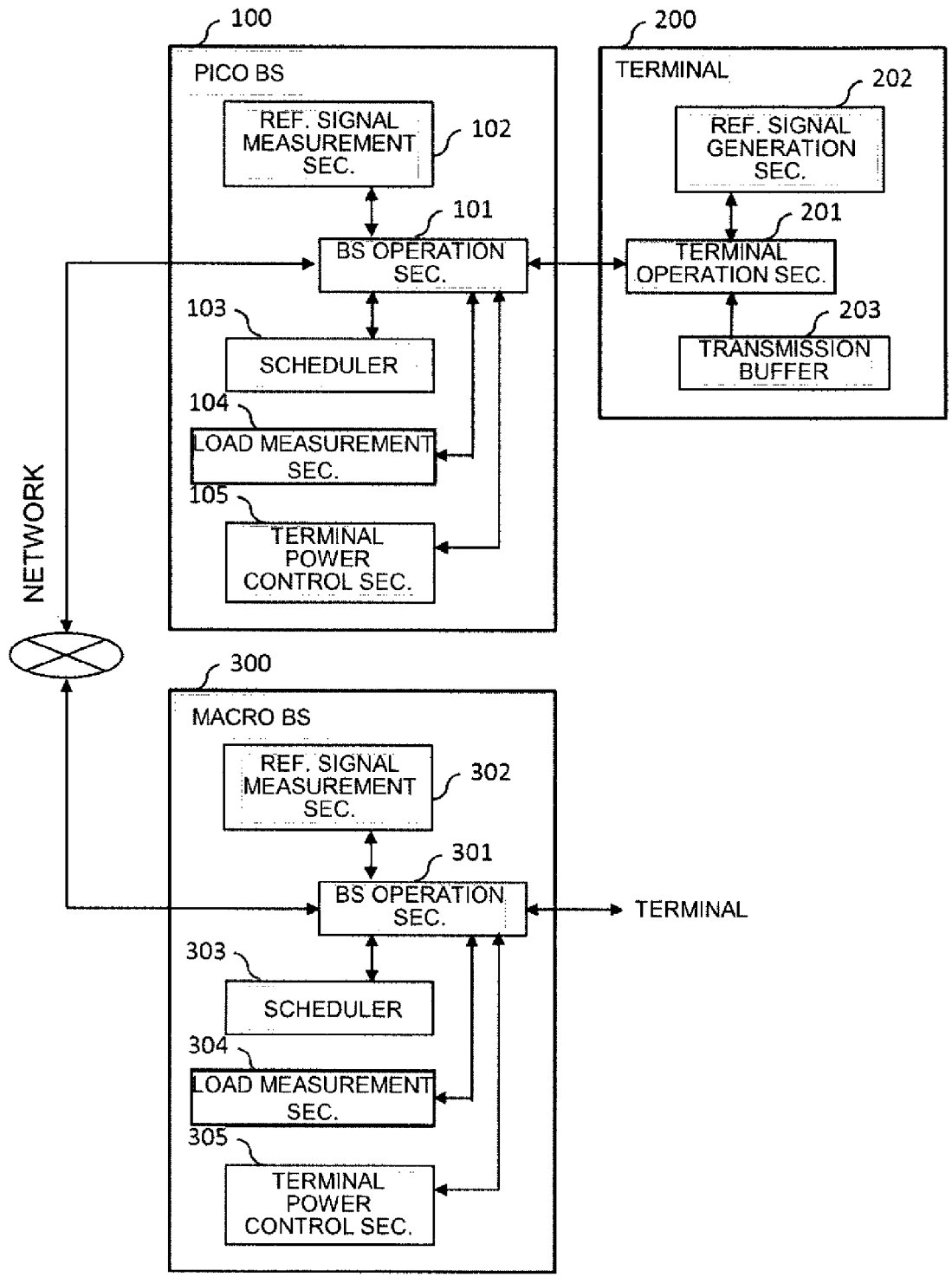
FIG. 3 is a block diagram showing a more detailed architecture of the radio communication system shown in FIG. 2.

Referring to FIG. 3, the radio communication system according to the present exemplary embodiment includes the pico base station 100, terminal 200, and macro base station 300. The pico base station 100 forms an open cell similarly to the macro base station 300. For a network structure, a heterogeneous network is assumed in which the macrocell 300a and picocell (small cell) 100a coexist, as in FIG. 2. The pico base station 100 can wirelessly communicate with the terminal 200 located within the communication area (picocell) of the own station through a radio channel, and can communicate data with the macro base station 300 and other neighbor base stations through a network. Note that the pico base station 100 or macro base station 300 can connect to a plurality of terminals, but FIG. 3 shows only one terminal 200 to avoid complexity. Moreover, two or more pico base stations 100 and macro base stations 300 may exist. A radio band is divided into physical resource blocks PRB, which are units of assignment. In the present exemplary embodiment, a description will be given, taking an LTE uplink as an example of the radio communication system.

<Pico Base Station>

The pico base station 100 includes, as main functional sections, a base station operation section 101, a reference signal measurement section 102, a scheduler 103, a load measurement section 104, and a terminal power control section 105.

The base station operation section 101 has functions equivalent to those of a base station generally used in a radio communication system, such as a function of receiving and demodulating an uplink channel signal. The configuration and operations thereof are well known, and therefore a description thereof will be omitted.

The reference signal measurement section 102 has a function of measuring communication path quality, such as SINR (Signal to Interference and Noise power Ratio), from a reference signal received from the terminal 200, and a function of estimating the SINR of an uplink data channel (PUSCH) by using the measured SINR. If there is a difference in transmission power between the reference signal and the PUSCH, the SINR of the PUSCH is estimated after the difference has been adjusted. However, it is assumed that there is no difference in transmission power in the present exemplary embodiment.

The scheduler 103 has a function of determining radio resources to assign to the terminal 200, such as PRBs and a MCS Index, in consideration of the estimated SINR of the PUSCH and a buffer status report (BSR) received from the terminal 200, and a function of notifying information about the radio resources assigned as scheduling information to the terminal 200 via the base station operation section 101. The BSR will be described in the configuration of the terminal 200.

The processing for assigning radio resources is performed in units of subframes (here, 1 ms) as follows. The scheduler 103 determines radio resources to assign such as to maximize transport block size (TBS). The TBS is calculated by using a TBS Index and the number of PRBs, wherein the number of PRBs can be calculated by determining PRBs to assign, and the TBS Index can be determined by referring to a lookup table using the MCS Index (see 3GPP TS 36.213 V10.7.0 (2012-09), 3GPP TSG RAN E-UTRA Physical layer procedures, pp. 33, 34-39). The MCS Index is determined by referring to a lookup table of the base station using the estimated SINR of the PUSCH, wherein this lookup table is created generally through link level simulation in which a physical layer is simulated.

The load measurement section 104 has a function of measuring a load on the pico base station 100, a function of notifying the measured load to neighbor cells including the macro base station 300 through the network, and a function of compiling load information received from neighbor base stations. In the present exemplary embodiment, it is assumed that a PRB usage rate (PRB usage) is used for a load, and that a PRB usage is notified at preset cycles.

The terminal power control section 105 has a function of calculating a relative load on the own cell to that on an adjacent cell by using the load information on the pico base station 100 and received from the neighbor base stations, and a function of adjusting a transmission power parameter of a terminal (here, the terminal 200) located within the communication area of the own station by using the relative load and notifying a result thereof to the pico terminal. In the present exemplary embodiment, for the transmission power parameter, target received power ($P_{O\_NOMINAL\_PUSCH}$) that is common among terminals connected to the same cell is adjusted.

<Terminal>

The terminal 200 is a mobile station (radio communication terminal) capable of connecting to a macrocell and a picocell and mainly includes a terminal operation section 201, a reference signal generation section 202, and a transmission buffer 203. Hereinafter, it is assumed that the terminal 200 is a pico terminal connected to the pico base station 100.

The terminal operation section 201 has functions equivalent to those of a terminal generally used in a radio communication system, such as reporting a BSR, which indicates the size of data buffered in the transmission buffer 203, to the pico base station 100. The configuration and operations thereof are well known, and therefore a description thereof will be omitted.

The reference signal generation section 202 has a function of transmitting a reference signal for the pico base station 100 to measure communication path quality, to the pico base station 100 via the terminal operation section 201 at predetermined timings.

The transmission buffer 203 has a function of buffering packet data the terminal 200 will transmit and accumulating it along with management information such as arrival time and packet size. This data is transmitted to the pico base station 100 via the terminal operation section 201 based on scheduling information, which is received from the pico base station 100.

<Macro Base Station>

The macro base station 300 includes, as main functional sections, a base station operation section 301, a reference signal measurement section 302, a scheduler 303, a load measurement section 304, and a terminal power control section 305, whose basic functions are similar to those of the pico base station 100. That is, the base station operation section 301, reference signal measurement section 302, scheduler 303, and load measurement section 304 have the same functions of the base station operation section 101, reference signal measurement section 102, scheduler 103, and load measurement section 104 of the pico base station 100, respectively. However, the terminal power control section 305 has a function of notifying a predetermined transmission power parameter to a terminal (macro terminal) located within the communication area of the own station.

3. Transmission Power Control Operations

Next, transmission power control operations of the base station 100 according to examples of the present invention will be described with reference to FIGS. 4 and 5.

3.1) First Example

According to a first example of the present invention, a PRB usage is used as a load; a load difference is used as a relative load; common target received power Po_No_Pusch ($P_{O\_NOMINAL\_PUSCH}$) is used as a transmission power adjustment parameter; and fixed values are used for adjusting transmission power, which will be described next.

Referring to FIG. 4, the terminal power control section 105 of the pico base station 100 uses the latest values of the load, PRB usage (PrbUsg_p), on the picocell (own cell) and of the load, PRB usage (PrbUsg_m), on the macrocell (neighbor cell), which is received from the macro base station 300, to calculate the relative load DelPrbUsg in accordance with the following equation (3) (Operation S401):

$$DelPrbUsg = PrbUsg\_p - PrbUsg\_m \qquad (3).$$

Subsequently, the terminal power control section 105 determines whether or not the transmission power of the terminal 200 is increasing, in accordance with the following expression (4) (Operation S402):

$$Flag\_TpcUp == False? \qquad (4)$$

where a flag Flag_TpcUp is a flag for determining whether or not the transmission power of the terminal 200 located within the communication area of the own station is increasing. If it is increasing, Flag_TpcUp=True. If it is not increasing, Flag_TpcUp=False. Note that its initial value is assumed to be Flag_TpcUp=False.

If the transmission power of the terminal 200 is not increasing (Operation S402; YES), it is determined whether or not the relative load DelPrbUsg is equal to or more than an increase threshold Th_TpcUp for increasing the transmission power, in accordance with the following expression (5) (Operation S403):

$$DelPrbUsg >= Th\_TpcUp? \qquad (5).$$

If the relative load DelPrbUsg is equal to or more than the increase threshold Th_TpcUp (Operation S403; YES), the flag for transmission power increase, Flag_TpcUp, is set to True, then the common target received power Po_No_Pusch [dBm] is updated to a larger value Po_No_Up, in accordance with the following equation (6), and then a result thereof is notified to the terminals located in the communication area of the own station (Operation S404). It is assumed that Po_No_Up is a larger value than a default value Po_No_Def:

$$Po\_No\_Pusch = Po\_No\_Up(>Po\_No\_Def) \qquad (6).$$

If the relative load DelPrbUsg is smaller than the predetermined threshold Th_TpcUp (Operation S403; NO), the processing is terminated.

On the other hand, when the transmission power of the terminal 200 is increasing (Operation S402; NO), it is determined whether or not the relative load DelPrbUsg is smaller than a decrease threshold Th_TpcDown for returning the transmission power to the default value, in accordance with the following expression (7) (Operation S405):

$$DelPrbUsg < Th\_TpcDown? \qquad (7).$$

Here, it is assumed that the decrease threshold Th_TpcDown is a smaller value than the above-mentioned increase threshold Th_TpcUp. A hysteresis margin can be configured by setting the decrease threshold Th_TpcDown smaller than the increase threshold Th_TpcUp, whereby it is possible to suppress a ping pong phenomenon, in which the transmission power of a pico terminal frequently increases and decreases.

If the relative load DelPrbUsg is smaller than the decrease threshold Th_TpcDown (Operation S405; YES), the flag for transmission power increase, Flag_TpcUp, is reset to False; the common target received power Po_No_Pusch [dBm] is updated to the default value Po_No_Def in accordance with the following equation (8); and a result thereof is notified to the terminal 200 located in the communication area of the own station (Operation S406):

$$Po\_No\_Pusch = Po\_No\_Def \qquad (8).$$

If the relative load DelPrbUsg is not smaller than the decrease threshold Th_TpcDown (Operation S405; NO), the processing is terminated.

Note that in the present example, it is assumed that the target received power Po_No_Pusch for macro terminals, which is set by the macro base station 300, is the same as the default value Po_No_Def of the pico terminal.

According to the above-described transmission power control, the transmission power of the pico terminal is increased when the load on the picocell is relatively higher than the load on the macrocell. Accordingly, user throughput fairness between the macrocell and the picocell can be improved without affecting load balancing between the macrocell and another cell, and consequently user throughput in the entire network can be improved.

Moreover although a PRB usage is used for a load in the present example, the present invention is not limited to this. For example, the number of terminals connected to each cell, or the average effective rate of terminals in each cell may be used. Further, the notification of a load may be directly performed between base stations as in the present example, or it is also possible that information is managed by an operation and maintenance (OAM) server and is notified from the OAM server.

Furthermore although a difference between the load PrbUsg_p on the own cell and the load PrbUsg_m on a neighbor cell (PrbUsg_p−PrbUsg_m) is used as the relative load DelPrbUsg in the present example, the present invention is not limited to this. For example, their ratio (PrbUsg_p/PrbUsg_m) may also be used.

Moreover, although the target received power $P_{O\_NOMINAL\_PUSCH}$ that is common among terminals connected to the same cell is used as a transmission power parameter, the present invention is not limited to this. For example, the received power offset $P_{O\_UL\_PUSCH}(i)$ specific to an individual terminal or the path loss correction coefficient α may be used. Alternatively, it is also possible to combine a plurality of parameters among these parameters.

3.2) Second Example

According to a second example of the present invention, a PRB usage is used as a load; a load difference is used as a relative load; common target received power Po_No_Pusch ($P_{O\_NOMINAL\_PUSCH}$) is used as a transmission power adjustment parameter; and step addition/subtraction is used for adjusting transmission power, which will be described next.

Referring to FIG. 5, the terminal power control section 105 of the pico base station 100, as in Operation S401 in the first example, uses the latest values of the load, PRB usage (PrbUsg_p), on the picocell (own cell) and of the load, PRB usage (PrbUsg_m), on the macrocell (neighbor cell), which is received from the macro base station 300, to calculate the relative load DelPrbUsg in accordance with the equation (3) (Operation S501).

Subsequently, the terminal power control section 105 determines whether or not the relative load DelPrbUsg is equal to or more than an increase threshold Th_TpcDelUp for increasing the transmission power, in accordance with the following expression (9) (Operation S502):

$$DelPrbUsg >= Th\_TpcDelUp? \qquad (9).$$

If the relative load DelPrbUsg is equal to or more than the increase threshold Th_TpcDelUp (Operation S502; YES), a value of the common target received power Po_No_Pusch obtained when it is increased by a predetermined width StepUp, or a maximum value Po_No_Pusch_Max thereof, whichever is smaller, is set in accordance with the following expression (10), and a result thereof is notified to the terminals located in the communication area of the own station (Operation S503):

$$Po\_No\_Pusch=MIN(Po\_No\_Pusch+StepUp, Po\_No\_Pusch\_Max) \qquad (10)$$

where StepUp (>0) is the size of a step increased. Moreover, MIN(X, Y) is a function to return the smallest value of X and Y, and Po_No_Pusch_Max is a maximum value of Po_No_Pusch to be set. An initial value of Po_No_Pusch is assumed to be the default value Po_No_Def in the first example.

On the other hand, if the relative load DelPrbUsg is smaller than the increase threshold Th_TpcDelUp (Operation S502; NO), it is determined whether or not the relative load DelPrbUsg is smaller than a decrease threshold Th_TpcDelDown for decreasing the transmission power, based on the following expression (11) (Operation S504):

$$DelPrbUsg < Th\_TpcDelDown \qquad (11).$$

When the relative load DelPrbUsg is smaller the decrease threshold Th_TpcDelDown (Operation S504; YES), a value of the target received power Po_No_Pusch obtained when it is decreased by a predetermined size StepDown, or a minimum value Po_No_Pusch_Min thereof, whichever is greater, is set in accordance with the following expression (12), and a result thereof is notified to the terminals located in the communication area of the own station (Operation S505):

$$Po\_No\_Pusch=MAX(Po\_No\_Pusch-StepDown, Po\_No\_Pusch\_Min) \qquad (12)$$

where StepDown (>0) is the width of a step decreased. Moreover, MAX(X, Y) is a function to return the largest value of X and Y, and Po_No_Pusch_Min is a minimum value of Po_No_Pusch to be set. Note that when the relative load DelPrbUsg is not smaller than the decrease threshold Th_TpcDelDown (Operation S504; NO), the processing is terminated.

According to the present example, a transmission power parameter such as the common target received power Po_No_Pusch can be finely adjusted by a predetermined size of a step. Accordingly, user throughput fairness between the macrocell and the picocell can be even further improved.

4. Other Embodiments

An exemplary embodiment and examples of the present invention have been described hereinabove, but the present invention is not limited to these. The present invention may be applied to a system including a plurality of equipment, or may be applied to a single-unit device. Moreover, the present invention can also be applied when programs implementing the functions described in the examples above are provided from a system or remotely and the processing in the operational procedure described in the exemplary embodiment is performed. Accordingly, the programs installed in a base station and executed on a processor within the base station to cause the base station to implement the functions of the present invention, as well as any media storing such programs and any servers allowing the programs to be downloaded, are incorporated in the scope of the present invention.

5. Additional Statements

Part or all of the above-described exemplary embodiment can also be stated as in, but is not limited to, the following additional statements.

(Additional Statement 1)

A radio station whose radio area, at least at part thereof, is adjacent to a radio area managed by another radio station, which is larger than this radio area, characterized by comprising:

load acquisition means that acquires a load on the own station and a load on the another radio station; and transmission power control means that controls transmission power of a radio terminal connected to the radio area of the own station, based on a relative magnitude of the load on the own station to the load on the another radio station.

(Additional Statement 2)

The radio station according to additional statement 1, characterized in that the transmission power control means controls increasing or decreasing of the transmission power of the radio terminal by comparing the relative magnitude of the load on the own station with an increase threshold or a decrease threshold.

(Additional Statement 3)

The radio station according to additional statement 2, characterized in that widths of an increase and a decrease in the transmission power of the radio terminal are preset by using a transmission power parameter.

(Additional Statement 4)

The radio station according to additional statement 3, characterized in that the transmission power parameter is set to a predetermined value of transmission power.

(Additional Statement 5)

The radio station according to additional statement 3, characterized in that the transmission power parameter is increased or decreased by a predetermined increasing or decreasing step.

(Additional Statement 6)

The radio station according to any one of additional statements 1 to 5, characterized in that the load is any of a radio band usage, the number of radio terminals currently connected, and an average transmission rate of radio terminals currently connected.

(Additional Statement 7)

The radio station according to any one of additional statements 1 to 6, characterized in that the transmission power control means controls the transmission power of the radio terminal by adjusting target received power that is common in the radio area of the own station, a received power offset for each individual radio terminal, or a path loss correction coefficient.

(Additional Statement 8)

The radio station according to any one of additional statements 1 to 7, characterized in that the transmission power control means calculates the relative magnitude of the load on the own station by using a difference between the load on the own station and the load on the another radio station.

(Additional Statement 9)

The radio station according to any one of additional statements 1 to 7, characterized in that the transmission power control means calculates the relative magnitude of the load on the own station by using a ratio between the load on the own station and the load on the another radio station.

(Additional Statement 10)

The radio station according to any one of additional statements 1 to 9, characterized in that the radio area of the another radio station is a macrocell, and the radio area of the own station is a small cell enclosed by the macrocell.

(Additional Statement 11)

An uplink transmission power control method of a radio station, for a radio terminal in a radio area of the own station, wherein the radio area of the own station, at least at part thereof, is adjacent to a radio area managed by another radio station, which is larger than the radio area of the own station, characterized by comprising: acquiring a load on the own station and a load on the another radio station; and controlling transmission power of the radio terminal based on a relative magnitude of the load on the own station to the load on the another radio station.

(Additional Statement 12)

The uplink transmission power control method according to additional statement 11, characterized in that increasing or decreasing of the transmission power of the radio terminal is controlled by comparing the relative magnitude of the load on the own station with an increase threshold or a decrease threshold.

(Additional Statement 13)

The uplink transmission power control method according to additional statement 12, characterized in that widths of an increase and a decrease in the transmission power of the radio terminal are preset by using a transmission power parameter.

(Additional Statement 14)

The uplink transmission power control method according to additional statement 13, characterized in that the transmission power parameter is set to a predetermined value of transmission power.

(Additional Statement 15)

The uplink transmission power control method according to additional statement 13, characterized in that the transmission power parameter is increased or decreased by a predetermined increasing or decreasing step.

(Additional Statement 16)

The uplink transmission power control method according to any one of additional statements 11 to 15, characterized in that the load is any of a radio band usage, the number of radio terminals currently connected, and an average transmission rate of radio terminals currently connected.

(Additional Statement 17)

The uplink transmission power control method according to any one of additional statements 11 to 16, characterized in that the transmission power of the radio terminal is controlled by adjusting target received power that is common in the radio area of the own station, a received power offset for each individual radio terminal, or a path loss correction coefficient.

(Additional Statement 18)

The uplink transmission power control method according to any one of additional statements 11 to 17, characterized in that the relative magnitude of the load on the own station is calculated by using a difference between the load on the own station and the load on the another radio station.

(Additional Statement 19)

The uplink transmission power control method according to any one of additional statements 11 to 17, characterized in that the relative magnitude of the load on the own station is calculated by using a ratio between the load on the own station and the load on the another radio station.

(Additional Statement 20)

The uplink transmission power control method according to any one of additional statements 11 to 19, characterized in that the radio area of the another radio station is a macrocell, and the radio area of the own station is a small cell enclosed by the macrocell.

(Additional Statement 21)

A radio communication system including a first radio station managing a first radio area and a second radio station managing a second radio area that is adjacent to at least part of the first radio area and is larger than the first radio area, characterized in that the first radio station uses first load information on the own station and second load information acquired from the second radio station to calculate a relative magnitude of the first load information to the second load information and, based on this relative magnitude, controls transmission power of a radio terminal connected to the radio area of the first radio station.

(Additional Statement 22)

A program for causing a computer in a radio station to function to implement uplink transmission power control for a radio terminal located in a radio area of the own station, wherein the radio area of the own station, at least at part thereof, is adjacent to a radio area managed by another radio station, which is larger than the radio area of the own station, characterized by causing the computer to function to implement:

acquiring a load on the own station and a load on the another radio station; and controlling transmission power of the radio terminal based on a relative magnitude of the load on the own station to the load on the another radio station.

INDUSTRIAL APPLICABILITY

The present invention is applicable to radio stations in heterogeneous networks.

REFERENCE SIGNS LIST

100 Pico base station
101 Base station operation section
102 Reference signal measurement section
103 Scheduler
104 Load measurement section
105 Terminal power control section
200 Terminal
201 Terminal operation section
202 Reference signal generation section
203 Transmission buffer
300 Macro base station
301 Base station operation section
302 Reference signal measurement section
303 Scheduler
304 Load measurement section
305 Terminal power control section

What is claimed is:

1. A radio station in a radio communication system including a plurality of radio areas, comprising:
a load acquisition section that acquires a first load on the radio station and a second load on the another radio station; and
a transmission power controller that controls transmission power of a radio terminal connected to the first radio area of the own station, based on a relative magnitude of the first load on the own station to the second load on the another radio station,
wherein the radio station manages a first radio area thereof, at least a part of which is adjacent to a second radio area which is managed by another radio station and is larger than the first radio area.

2. The radio station according to claim 1, wherein each of the first and second loads is any of a radio band usage rate, the number of radio terminals currently connected, and an average transmission rate of radio terminals currently connected.

3. The radio station according to claim 1, wherein the transmission power controller controls the transmission power of the radio terminal by adjusting target received power that is common in the first radio area of the own station, a received power offset for each individual radio terminal, or a path loss correction coefficient.

4. The radio station according to claim 1, wherein the transmission power controller calculates the relative magnitude of the first load on the the own station by using a difference between the first load on the own station and the second load on the another radio station.

5. The radio station according to claim 1, wherein the transmission power controller calculates the relative magnitude of the first load on the own station by using a ratio between the first load on the own station and the second load on the another radio station.

6. The radio station according to claim 1, wherein the second radio area of the another radio station is a macrocell, and the first radio area of the own station is a small cell surrounded by the macrocell.

7. The method according to claim 1, wherein the transmission power of the radio terminal is controlled by adjusting target received power that is common in the first radio area of the own station, a received power offset for each individual radio terminal, or a path loss correction coefficient.

8. A radio station in a radio communication system including a plurality of radio areas, comprising:
a load acquisition section that acquires a first load on the radio station and a second load on another radio station; and
a transmission power controller that controls transmission power of a radio terminal connected to the first radio area of the radio station, based on a relative magnitude of the first load on the radio station to the second load on the another radio station,
wherein the transmission power controller controls increasing or decreasing of the transmission power of the radio terminal by comparing the relative magnitude of the first load on the own station with an increase threshold or a decrease threshold.

9. The radio station according to claim 8, wherein step sizes of an increase and a decrease in the transmission power of the radio terminal are preset by using a transmission power parameter.

10. The radio station according to claim 9, wherein the transmission power parameter is set to a predetermined value of transmission power.

11. The radio station according to claim 9, wherein the transmission power parameter is increased or decreased by a predetermined increasing or decreasing step.

12. A method for controlling an uplink transmission power of a radio terminal located in a first radio area of a radio station in a radio communication system including a plurality of radio areas, comprising:
acquiring a first load on the radio station and a second load on the another station; and
controlling transmission power of the radio terminal based on a relative magnitude of the first load on the radio station to the second load on the another radio station,
wherein at least a part of the first radio area of the radio station is adjacent to a second radio area which is larger than the first radio area and is managed by another radio station.

13. The method according to claim 12, wherein each of the first and second loads is any of a radio band usage, the number of radio terminals currently connected, and an average transmission rate of radio terminals currently connected.

14. The method according to claim 12, wherein the relative magnitude of the first load on the own station is calculated by using a difference between the first load on the own station and the second load on the another radio station.

15. The method according to claim 12, wherein the relative magnitude of the first load on the own station is calculated by using a ratio between the first load on the own station and the second load on the another radio station.

16. A method for controlling an uplink transmission power of a radio terminal located in a first radio area of a radio station in a radio communication system including a plurality of radio areas, comprising:

acquiring a first load on the radio station and a second load on the another station; and controlling transmission power of the radio terminal based on a relative magnitude of the first load on the radio station to the second load on the another radio station, wherein increasing or decreasing of the transmission power of the radio terminal is controlled by comparing the relative magnitude of the first load on the own station with an increase threshold or a decrease threshold.

17. The method according to claim 16, wherein step sizes of an increase and a decrease in the transmission power of the radio terminal are preset by using a transmission power parameter.

18. The method according to claim 17, wherein the transmission power parameter is set to a predetermined value of transmission power.

19. The method according to claim 17, wherein the transmission power parameter is increased or decreased by a predetermined increasing or decreasing step.

20. A radio communication system including a plurality of radio areas, comprising:

a first radio station that manages a first radio area and a second radio station that manages a second radio area that is adjacent to at least part of the first radio area and is larger than the first radio area, wherein the first radio station uses first load information on the own station and second load information acquired from the second radio station to calculate a relative magnitude of the first load information to the second load information and, based on this relative magnitude, controls transmission power of a radio terminal connected to the radio area of the first radio station.

* * * * *

UNITED STATES PATENT AND TRADEMARK OFFICE
CERTIFICATE OF CORRECTION

PATENT NO.        : 9,578,607 B2
APPLICATION NO.   : 14/764415
DATED             : February 21, 2017
INVENTOR(S)       : Takahiro Nobukiyo Page 1 of 1

It is certified that error appears in the above-identified patent and that said Letters Patent is hereby corrected as shown below:

In the Specification

Column 2, Equation 1, Lines 6-7:
"$P_{PUSCH}N=min[P_{CMAX}(i), 10\ log_{10}(M_{PUSCH}N)+P_{O\_PUSCH}+\alpha \cdot PL+\Delta_{TF}(i)+f(i)]$" should be replaced with --$P_{PUSCH}(i)=min[P_{CMAX}(i),\ 10log_{10}(M_{PUSCH}(i))+P_{O\_PUSCH}+\alpha \cdot PL + \Delta_{TF}(i) + f(i)]$--;

Column 2, Line 13:
"a is" should be replaced with --α is--.

Signed and Sealed this
Twenty-eighth Day of August, 2018

Andrei Iancu
*Director of the United States Patent and Trademark Office*